United States Patent [19]

Kiuchi

[11] Patent Number: 4,703,678

[45] Date of Patent: Nov. 3, 1987

[54] BLANKING SHEAR MACHINE

[75] Inventor: Yoshinori Kiuchi, Hacienda Hts., Calif.

[73] Assignee: U.S. Amada Limited, Buena Park, Calif.

[21] Appl. No.: 927,172

[22] Filed: Nov. 5, 1986

[51] Int. Cl.[4] ............................................. B26D 5/08
[52] U.S. Cl. ......................................... 83/71; 83/216; 83/548; 83/559; 83/917
[58] Field of Search ............................. 83/71, 215–217, 83/219, 220, 548, 553, 693, 559, 917, 556, 600, 601, 554

[56] References Cited

U.S. PATENT DOCUMENTS

| | | | |
|---|---|---|---|
| 3,370,492 | 2/1968 | Treff | 83/216 |
| 3,691,887 | 9/1972 | Roch | 83/219 |
| 4,606,250 | 8/1986 | Krösbacher et al. | 83/559 |

Primary Examiner—Paul A. Bell
Assistant Examiner—Hien H. Phan
Attorney, Agent, or Firm—Wigman & Cohen

[57] ABSTRACT

A blanking shear machine has a rotatable upper turret having a holder for an upper blade. The upper blade has two contiguous sides which form a right angle therebetween. A rotatably mounted lower turret has a holder for a lower blade which corresponds to the upper blade. Means for clamping and positioning a workpiece are provided between the upper and lower turrets. The turrets are rotated to position the blades to provide the desired cut. A plurality of strikers are provided above the upper turret at four positions above the upper blade at which the contiguous sides of the blade are aligned with the X-axis and Y-axis coordinates. Means for actuating the strikers are provided to lower the upper blade to engage the lower blade, shearing the workpiece between the two blades.

3 Claims, 7 Drawing Figures

BLANKING SHEAR MACHINE

BACKGROUND OF THE INVENTION

1. Field of the Invention

The present invention relates to a blanking shear machine, and, more particularly, to a blanking shear machine having an upper turret provided with a holder for an upper blade and lower turret provided with a holder for a lower blade.

2. Description of the Related Art

Conventionally, in a blanking shear machine an upper blade formed on two contiguous sides with right angles therebetween mates with a corresponding lower blade, and, in one action, cuts two sides of a plate. The two sides with right angles therebetween clamp a workpiece in the form of a plate between the upper and lower blades, are made to agree in the X-axis and Y-axis directions of a numerically controlled positioning device, and then are secured so that they cannot rotate.

Accordingly, in the case where shearing is performed to a length longer than the length of one of the two sides right angles therebetween, the shearing by the blade is conducted such that the highest side of the punch blade is at one edge which is remote from the right angles, and the lowest part is at the remaining edge with the right angled section at a middle height, whereby a long linear shearing is performed, by repeating the shearing by one side of the blade. Accordingly, the overall size of the device must be very large, which is inconvenient.

In addition, in cutting out a comparatively large section in the center of a standard-sized plate to obtain a frame-shaped product, because the phenomenon by which the part which is cutaway by the shearing is pushed down is unavoidable, during the operation the plate work must be rotated with the clamp repositioned, which is inconvenient.

SUMMARY OF THE INVENTION

An object of the present invention is to provide, with due consideration to the drawbacks of such conventional methods, a blanking shear machine of a configuration wherein both the top and lower blades can be freely and individually rotatingly positioned, and, as required, linear trimming can be easily carried out without positioning the lower blade corresponding with the bottom of the top blade.

Briefly described, the above object is accomplished in accordance with the invention by providing a blanking shear machine wherein an upper turret is provided with a holder for an upper blade having two sides with right angles therebetween, so that the holder freely engages and disengages a lower blade; and wherein, a lower turret is provided with a holder for the lower blade corresponding with the upper blades. The upper blade and lower blade can be freely and individually rotatably positioned in the X-axis and Y-axis directions of the coordinate system of a numerically controlled positioning device for clamping a workpiece, which positioning device is located between the upper and lower blades. A plurality of strikers are provided to strike the upper blade on a top frame at the upper part of a right angled section of the upper blade at four positions which agree with the two contiguous sides of the upper blade in the X-axis and Y-axis directions, which strikers are selectively and freely driven.

BRIEF DESCRIPTION OF THE DRAWINGS

This and other objects, features, and advantages of the present invention will become more apparent from the following description of a preferred embodiment taken in conjunction with the accompanying drawings, in which.

DESCRIPTION OF THE PREFERRED EMBODIMENT

Following is a description of a preferred embodiment of the present invention, with reference to the drawings.

Figure 1:
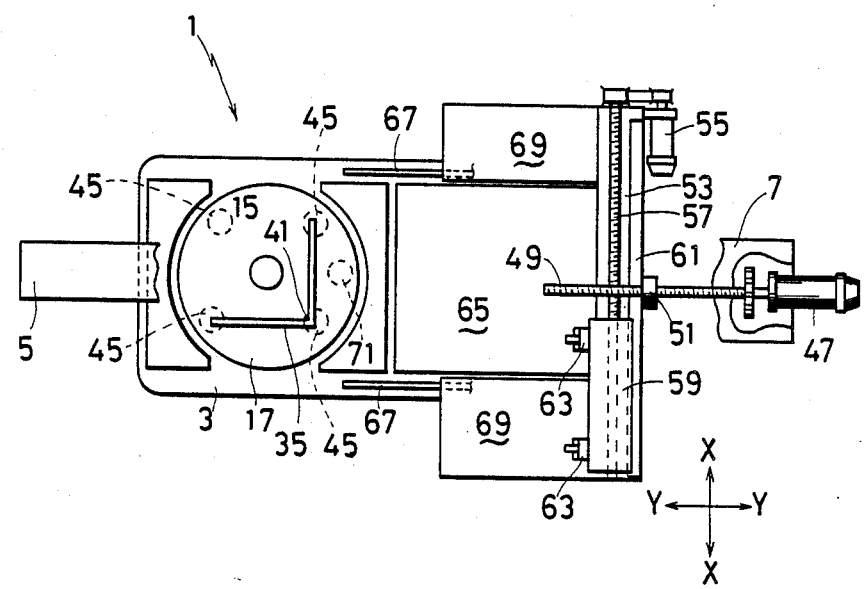
FIG. 1 is a cross sectional plan view of one part of a first embodiment of the blanking shear machine of the present invention.
Figure 2:
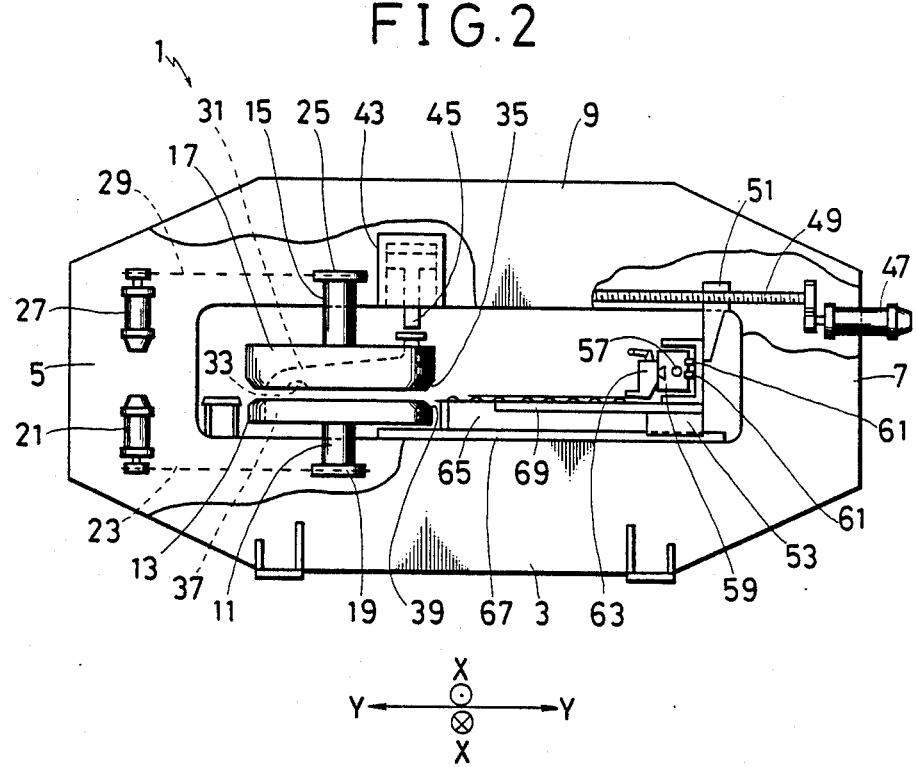
FIG. 2 is a front elevation of the part of the first embodiment of the blanking shear machine of the present invention shown in FIG. 1.

Now referring to FIG. 1 and FIG. 2, in a first embodiment of the present invention a blanking shear machine 1 comprises a base 3, a left column 5, a right column 7, and an upper frame 9, all of which form a gate shape. In the space between the base 3 and the upper frame 9, a lower turret 13 rotates freely on a shaft 11 provided on the base 3, and an upper turret 17 rotates freely through a shaft 15 from the upper frame 9.

A sprocket 19 is provided on the lower end of the shaft 11 of the lower turret 13, and this sprocket 19 is driven rotatingly and positioned through a chain 23 from an electric motor 21, which may be a pulse motor and the like, provided on the column 5.

In the same manner, a sprocket 25 on the upper end of the shaft 15 on the upper turret 17 is driven rotatingly and positioned through a chain 29 from an electric motor 27, which may be a pulse motor and the like, provided on the column 5.

An upper blade holder 31 on the upper turret 17 freely oscillates around an oscillating shaft 33. An upper blade 35 is mounted on the lower end of the upper blade holder 31. (This upper blade holder 31 is not shown in FIG. 1).

A lower blade 39 corresponding to the upper blade 35 is provided on the lower turret 13 through a lower blade holder 37.

In addition, a hydraulic cylinder 43 and a striker 45 on the lower end of a piston rod of the hydraulic cylinder 43 are provided on the lower surface of the upper from 9 in four positions where a right-angled section 41 of the rotating upper blade 35 occupies one of the four positions beneath the striker 45.

Further, on the lower surface of the upper frame 9 on the right side of FIG. 2, a lead screw 49 for the Y-axis, which is driven from a Y-axis motor 47 which can be a pulse motor or the like, is provided. A carriage base 53 movable in the Y direction is provided, movable by a threaded nut member 51 connected with the lead screw 49. On the carriage base 53, a lead screw 57 for the X-axis if provided, driven from a X-axis motor 55 in the same way. A carriage 59 is positioned in the X direction, through a nut member (not shown on the drawings) threaded with the lead screw 57, and guided by a pair of guide rails 61, 61.

A pair of clamps 63, 63 are provided on the turret side of the carriage 59. The carriage base 53 moves in the Y-axis direction, extending over a pair of moving tables 69, 69 which are guided in the Y direction on a pair of rails 67, 67 provided on the side of a central fixed table 65 on the base 3.

Further, on the right of the shaft 15 on the upper turret 17, a striker 71 for a later-described punch is provided on the lower surface of the upper frame 9, as shown in FIG. 1.

Figure 3:
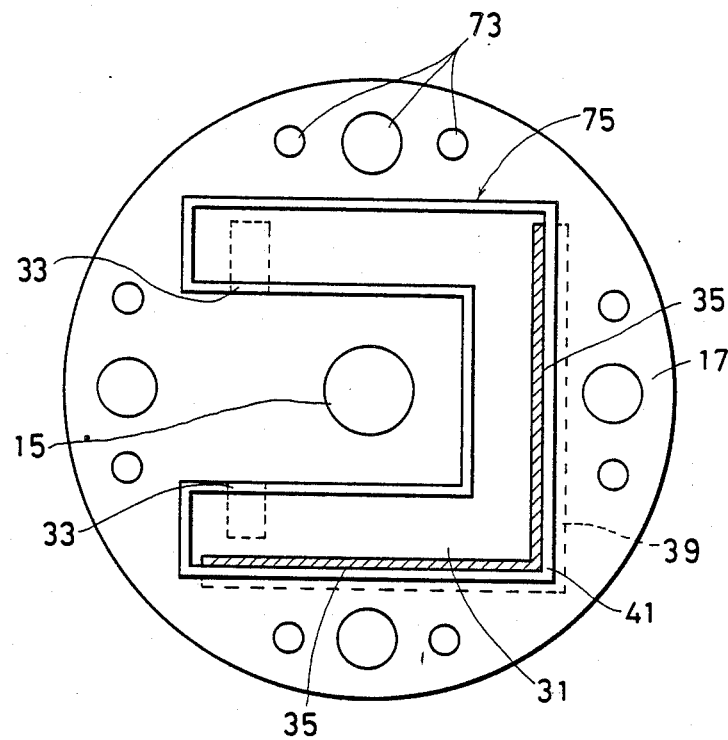
FIG. 3 is an enlarged plan view of the upper turret of the first embodiment of the blanking shear machine of the present invention shown in FIG. 1.
Figure 4:
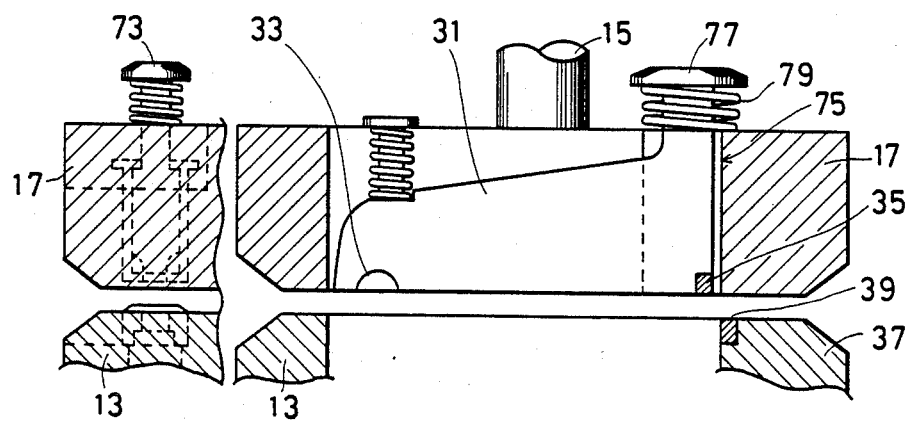
FIG. 4 is a sectional view of both the upper and lower turrets.

FIG. 3 and FIG. 4 show the relation between the upper blade holder 31 on the upper turret 17 and a plurality of punch heads 73 and the lower blade holder 37 of the lower turret 13.

A channel-shaped cut-out groove 75 is provided around the shaft 15 on the upper turret 17. The upper blade holder 31 is provided in a freely oscillating manner through the oscillating shaft 33. A lift spring 79, energized in the upward direction, is provided between the upper surface of the upper turret 17 and an upper blade head 77.

Figure 5:
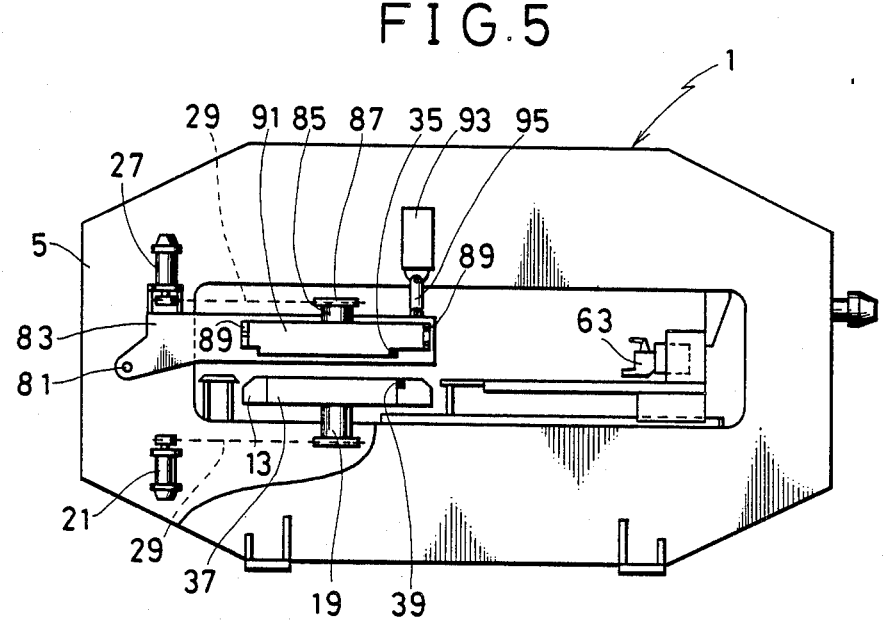
FIG. 5 is a sectional view of the elevation of one section of a second embodiment of the blanking shear machine of the present invention.

A second embodiment of the upper turret 17 of the present invention is shown in FIG. 5. In the first embodiment as shown in FIG. 2, the upper blade holder 31 oscillates in the cut-out groove 75 provided on the upper turret 17, while in the second embodiment, a shaft body 81 is provided on the left column 5 of the blanking shear machine 1. An oscillating body 83 is provided in a manner allowing it to freely oscillate around the shaft body 81.

The motor 27 (which may be a pulse motor), provided on the top of the shaft body 81, through the chain 29 drives a sprocket 87 provided on the top of a shaft 85 which vertically pierces the oscillating body 83. An upper blade holder 91 rotates supported by a bearing 89 in the middle of the oscillating body 83.

The right end of the oscillating body 83 in FIG. 5 is connected to a piston rod 95 for a hydraulic cylinder 93. When hydraulic cylinder 93 is actuated to extend piston rod 95 to rotate oscillating body 83 downwardly about shaft body 81, upper blade 35 provided on the lower surface of the upper blade holder 91 engages the lower blade 39 of the lower blade holder 37 on the lower turret 13, and performs a shearing action.

Figure 6:
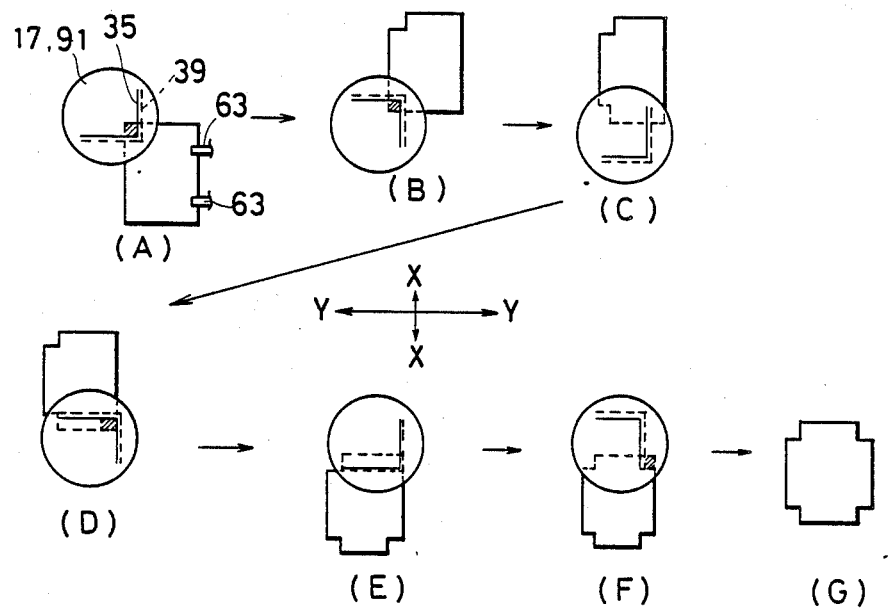
FIG. 6 is an explanatory view of one example of the operation of the present invention.

Next, the process using the blanking shear machines of the first and second embodiments, as shown in FIG. 6, will be described. First the corner cut-off in A is performed in one action, with the upper blade 35 and the lower blade 39 positioned exactly as shown in FIG. 1.

For the corner cut-off in B, the upper blade 35 and the lower blade 39 are both rotated 90 degrees in the counterclockwise direction, the plate work is moved into the desired position with a plate work positioning device, and the corner shearing is performed. To carry out the shearing in C, the upper blade 35 and the lower blade 39 are both rotated 90 degrees in the clockwise direction, and in that status the plate work is positioned at the desired location, and a short shearing cut is made in the X-axis direction.

For the cut at D, both the upper blade 35 and the lower blade 39 are rotated 90 degrees in the counterclockwise direction to place the plate work in a desired location, and a short cut is made in the Y-axis direction, with the stroke restrained by a proper means.

For the cut at E, both the upper blade 35 and the lower blade 39 are rotated 90 degrees in the clockwise direction from the status in D, a short shearing cut is made in the Y-axis direction, with the stroke restrained part way through.

For the cut at F, both the upper blade 35 and the lower blade 39 are rotated 90 degrees in the counterclockwise direction from the status in E and a short shearing cut is made in the X-axis direction.

In this way, the process can be carried out to produce the plate shown at G with its four corners cut out, without having to change the clamping on the plate at any time during the operation.

In the explanation of FIG. 6, two process actions were performed for the shearing of the upper and lower right side corners of diagram G, involving the regulation of the stroke of the striker 45 and the piston rod 95 to a short length. As can be clearly understood from FIG. 2 and FIG. 5, the clamp 63 of the device for positioning the plate work under numerical control intervenes between the upper turret 17 and the lower turret 13, so that the right edge of the plate work cannot be transported to a deeper position.

Figure 7:
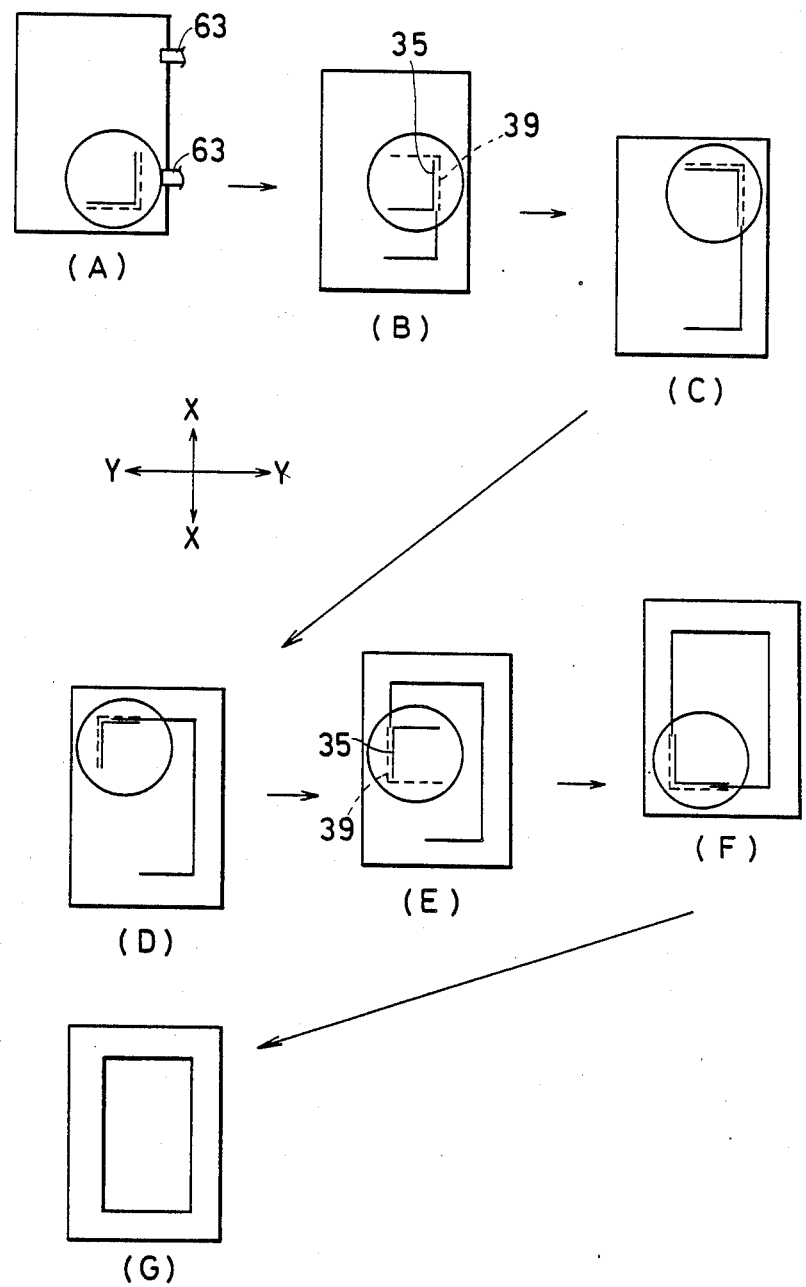
FIG. 7 is an explanatory view of another example of the operation of the present invention.

FIG. 7 illustrates another shearing operation carried out with the devices of the first and second embodiments of the present invention. In this example, short cuts are made in the middle surface of a plate work to obtain the frame-shaped product G.

In the diagram, the upper blade is shown in solid lines and the lower blade in dotted lines. In the four corner short cuts shown in A, C, D, and F, the two sides of the upper blade correspond with the two sides of the lower blade, and two-side shearing is performed in one action. In the processes at B and E, only one side of the upper blade corresponds with a side of the lower blade so that only half-cutting is performed in the X-axis direction. The term "half-cutting" means a cutting process using part of the length of a blade as in cutting a piece of cloth with scissors.

As can be readily understood from the above detailed description of the embodiments of the blanking shear device of the present invention, the device is comparatively small. The inconvenience of changing the clamp on the plate work of the automatic positioning device partway through the process is eliminated.

Accordingly, unmanned operation following a computer program is possible, resulting in an increase in operating efficiency.

Further, it can be clearly understood that the devices embodying the technical concept of the blanking shear machine of the present invention are not limited to the configurations described above, and the design can easily be changed without deviating from the technical concept.

What is claimed is:
1. A blanking shear machine comprising:
 a vertically disposal frame, said frame defining a horizontal X-axis and Y-axis coordinate system;
 an upper turret rotatably mounted on said frame;
 an upper blade holder mounted on said upper turret for pivotal movement between an engaged and an unengaged position;
 an upper blade mounted on said upper blade holder, said upper blade having two contiguous sides forming a right angle therebetween, wherein the point at which said two contiguous sides meet define a right-angled section;

a lower turret rotatable mounted on said frame;

a lower blade holder mounted on said lower turret;

a lower blade mounted on said lower blade holder, said lower blade having sides corresponding with said upper blade;

means for clamping and positioning a workpiece under numerical control between said upper and lower blades along said X-axis and Y-axis coordinates;

a plurality of strikers mounted on said frame above said upper turret, one of each of said strikers positioned at one of four positions at which said right-angled section of said upper blade is disposed so that said contiguous sides of said blade are in alignment with X-axis and Y-axis coordinates of the coordinate system; and means for actuating said strikers to pivot said upper blade to shear a workpiece positioned between said upper blade and said lower blade.

2. The blanking shear machine of claim 1 further comprising a plurality of punches provided on a circumference close to the outer periphery of said upper turret, and a striker mounted on said upper frame above said circumference for striking said plurality of punches provided on said circumference.

3. A blanking shear machine comprising:

a vertically disposed frame, said frame defining a horizontal X-axis and Y-axis coordinate system;

an upper turret rotatably mounted on said frame, said upper turret being mounted on said frame for pivot movement between an engaged and an unengaged position;

an upper blade holder mounted on said upper turret;

an upper blade mounted on said upper blade holder, said upper blade having two contiguous sides forming a right angle therebetween, wherein the point at which said two contiguous sides meet define a right-angled section;

a lower turret rotatable mounted on said frame;

a lower blade holder mounted on said lower turret;

a lower blade mounted on said lower blade holder, said lower blade having sides corresponding with said upper blade;

means for clamping and positioning a workpiece under numerical control between said upper and lower blades along said X-axis and Y-axis coordinates;

a plurality of strikers mounted on said frame above said upper turret, one of each of said strikers positioned at one of four positions at which said right-angled section of said upper blade is disposed so that said contiguous sides of said blade are in alignment with X-axis and Y-axis coordinates of the coordinate system; and means for actuating said strikers to pivot said upper blade to shear a workpiece positioned between said upper blade and said lower blade.

* * * * *